United States Patent
Iwamura et al.

(10) Patent No.: US 8,320,964 B2
(45) Date of Patent: Nov. 27, 2012

(54) MOBILE STATION

(75) Inventors: Mikio Iwamura, Tokyo (JP); Itsuma Tanaka, Yokohama (JP); Keisuke Suzuki, Yokosuka (JP); Masashi Kanauchi, Yokosuka (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 13/500,091

(22) PCT Filed: Oct. 5, 2010

(86) PCT No.: PCT/JP2010/067427
§ 371 (c)(1),
(2), (4) Date: Jun. 15, 2012

(87) PCT Pub. No.: WO2011/043322
PCT Pub. Date: Apr. 14, 2011

(65) Prior Publication Data
US 2012/0244853 A1    Sep. 27, 2012

(30) Foreign Application Priority Data

Oct. 5, 2009 (JP) .............................. P2009-232036
Jan. 12, 2010 (JP) .............................. P2010-004154

(51) Int. Cl.
*H04B 1/38* (2006.01)
*H04W 4/00* (2009.01)
(52) U.S. Cl. .................. 455/560; 455/422.1; 455/414.1
(58) Field of Classification Search ................. 455/434, 455/450, 414.1, 560, 414.4, 445, 507, 509, 455/422.1, 404.2; 370/329, 328, 338, 347, 370/337
See application file for complete search history.

(56) References Cited

U.S. PATENT DOCUMENTS

| | | | |
|---|---|---|---|
| 2004/0148352 A1* | 7/2004 | Menon et al. | 709/205 |
| 2005/0043061 A1* | 2/2005 | Sato et al. | 455/560 |
| 2006/0009200 A1* | 1/2006 | Jung et al. | 455/414.1 |

OTHER PUBLICATIONS

NTT Docomo, Inc.,"Service Specific Access Control (SSAC) Overview," 3GPP TSG-RAN WG2 #66bis, R2-093966, Los Angeles, US; Jun. 29-Jul. 3, 2009, 3 pages.
NTT Docomo, Inc., "Implementing Service Specific Access Control (SSCA)," 3GPP TSG-RAN WG2 Meeting #66bis, R2-093967, Los Angeles, US, Jun. 29-Jul. 3, 2009, 12 pages.
3GPP TS 22.011 V9.2.0, Sep. 2009, "3rd Generation Partnership Project; Technical Specification Group Services and System Aspects; Service accessibility (Release 9)," pp. 15-18, 5 pages.

(Continued)

*Primary Examiner* — Kiet Doan
(74) *Attorney, Agent, or Firm* — Osha Liang LLP

(57) ABSTRACT

To conceal AC of a mobile station UE from an MMTEL/IMS layer function, and at the same time, perform SSAC barring in the MMTEL/IMS layer function. In the mobile station UE according to the present invention, an AS layer function 10 includes a broadcast information reception unit 11 configured to receive broadcast information, an adjustment unit 13 configured to generate second barring information (ac-BarringFactor and ac-BarringTime) based on first barring information (ac-BarringFactor and ac-BarringTime) included in the AC of the mobile station UE and the broadcast information, and a notification unit 14 configured to notify the MMTEL/IMS layer function 30 of the second barring information, and the MMTEL/IMS layer function 30 includes a determination unit 24 configured to determine whether or not it is possible to perform a call request process based on the second barring information.

10 Claims, 7 Drawing Sheets

OTHER PUBLICATIONS

3GPP TS 36.331 V9.0.0, Sep. 2009, "3rd Generation Partnership Project; Technical Specification Group Radio Access Network; Evolved Universal Terrestrial Radio Access (E-UTRA) Radio Resource Control (RRC); Protocol specification (Release 9)," pp. 32-37, 7 pages.

NTT Docomo, Inc., "Access stratum model of SSAC," 3GPP TSG-RAN WG2 #67bis, R2-096016, Miyazaki, Japan, Oct. 12-16, 2009, 5 pages.

NTT Docomo, Inc., "Resolving open issues of SSAC," 3GPP TSG-RAN WG2 Meeting #68bis, R2-100525, Valencia, Spain, Jan. 18-22, 2010, 4 pages.

3GPP TS 22.011 V11.2.0, Dec. 2011, "3rd Generation Partnership Project; Technical Specification Group Services and System Aspects; Service accessibility (Release 11)," 26 pages.

3GPP TS 36.331 V10.5.0, Mar. 2012, "3rd Generation Partnership Project; Technical Specification Group Radio Access Network; Evolved Universal Terrestrial Radio Access (E-UTRA) Radio Resource Control (RRC); Protocol specification (Release 10)," 302 pages.

Office Action issued in corresponding Japanese Patent Application No. 2010-004154, mailed Dec. 15, 2010, with translation, 5 pages.

International Search Report issued in PCT/JP2010/067427, mailed on Dec. 21, 2010, with translation, 4 pages.

* cited by examiner

MOBILE STATION

TECHNICAL FIELD

The present invention relates to a mobile station.

BACKGROUND ART

In a mobile communication system defined by the 3GPP, each mobile station UE (USIM: User Subscriber Identity Module) possesses at least one of ACs (Access Classes) 0 to 9.

Furthermore, a special mobile station UE (USIM) for network operators, police, or government officials may possess ACs 11 to 15. ACs 11 to 15 are hereinafter called "Special ACs". Note that AC 10, which is an emergency call AC, is used for issuing a call such as 110 (police) and 119 (fire station), and is not possessed by the mobile station UE (USIM).

FIG. 9 shows an example of an access barring control method according to an Rel. 8 LTE (Long Term Evolution) scheme.

As shown in FIG. 9, according to the Rel. 8 LTE scheme, a mobile station UE is configured to determine whether or not it is possible to issue a call depending on the type of the call, including an mobile terminating call, an emergency call, an mobile originating call, and a mobile originating signaling, and also depending on the barring information (ac-BarringInformation) included in the ACs to which the mobile station UE belongs and the broadcast information (SIB2: System Information Block 2), that is, the "Common AC barring information".

For example, as regard to an mobile originating call, first of all, the mobile station UE checks whether or not ACs 11 to 15 are possessed, and if ACs 11 to 15 are possessed, the mobile station UE checks the barring information (ac-BarringForSpecialAC) for the "Special ACs" included in the broadcast information (SIB2).

"ac-BarringForSpecialAC" includes one-bit information for each of ACs 11 to 15 (total five bits) expressing whether it is possible to issue a call. When the mobile station UE determines that it is possible to issue a call based on "ac-BarringForSpecialAC" even for any one of ACs 11 to 15 that the mobile station UE possesses, a call request process is started.

On the other hand, when the mobile station UE does not possess ACs 11 to 15, or when it is determined that all of the ACs 11 to 15 possessed by the mobile station UE are not capable of issuing a call based on "ac-BarringForSpecialAC", the mobile station UE generates a uniform random number between 0 and 1, and determines whether or not the generated random number is smaller than the "ac-BarringFactor" included in the broadcast information (SIB2).

If the generated random number is smaller than "ac-BarringFactor", the mobile station UE activates the call request process, but in other cases, the mobile station UE activates a prohibition timer for an mobile originating call. When the prohibition timer for an mobile originating call is being activated, the mobile station UE is prohibited from starting the call request process for new mobile originating calls.

Furthermore, the mobile station UE is configured such that when it is attempted to issue a call but this attempt is Rejected by the radio base station eNB, mobile originating calls other than emergency calls are barred for the period of the timer value (that is, during the period the timer T302 is activated) included in RRCConnectionReject.

On the other hand, according to an Rel. 9 LTE scheme, SSAC (Service Specific Access Control) is under discussion.

According to SSAC, it is assumed that barring control can be independently enabled in "MMTEL/IMS-voice mobile originating calls", "MMTEL/IMS-video mobile originating calls", and "other mobile originating calls".

Thus, according to the Rel. 9 LTE scheme, the three types of barring information such as "ac-BarringFactor", "ac-BarringTime", and "ac-BarringForSpecialAC" are expected to be broadcast independently.

Note that new barring information ("SSAC barring information") is expected to be broadcast for "MMTEL/IMS-voice mobile originating calls" and "MMTEL/IMS-video mobile originating calls", and the "Common AC barring information" that is used in the Rel. 8 LTE scheme is expected to be applied as barring information for "other mobile originating calls".

Here, identification of the type of an mobile originating call in an AS layer function is not desired when protocol separation is taken into consideration, and therefore, barring (SSAC barring) of "MMTEL/IMS-voice mobile originating calls" and "MMTEL/IMS-video mobile originating calls" is expected to be achieved in an MMTEL/IMS layer function.

However, in a mobile communication system according to the Rel. 9 LTE scheme that is assumed as described above, there occurs a need of notifying the MMTEL/IMS layer function of the ACs to which the mobile station UE belongs, from the AS layer function.

In this case, in a terminal such as a data card, the MMTEL/IMS layer function may be installed on the laptop side, and there is a possibility that the ACs of the mobile station UE are exposed from the terminal to the laptop or the user, resulting in a problem because it is not desirable in view of security.

SUMMARY OF THE INVENTION

Thus, the present invention has been achieved in view of the above problem and an object thereof is to provide a mobile station that can conceal the AC of the mobile station UE from the MMTEL/IMS layer function, and at the same time, perform SSAC barring in the MMTEL/IMS layer function.

A first characteristic of the present embodiment is summarized in that A mobile station, comprising, a first layer function that communicates between the mobile station and a radio access network, and a second layer function that terminates between the mobile station and a service control network, in which the first layer function comprises, a broadcast information reception unit configured to receive the broadcast information, an adjustment unit configured to generate second barring information based on first barring information included in the access classes of the mobile station and the broadcast information, and a notification unit configured to notify the second layer function of the second barring information, and the second layer function comprises a determination unit configured to determine whether or not it is possible to perform a call request process based on the second barring information.

DETAILED DESCRIPTION

Configuration of Mobile Communication System According to First Embodiment of the Present Invention With reference to FIG. 1 to FIG. 4, the configuration of a mobile communication system according to a first embodiment of the present invention will be described.

Figure 1:
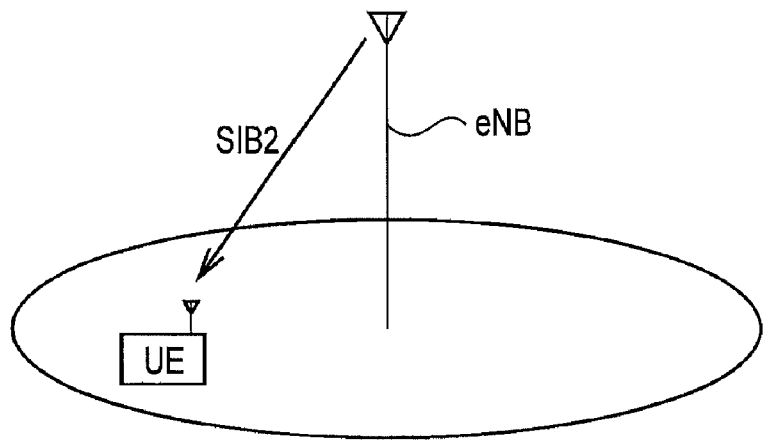
FIG. 1 is a diagram showing the entire configuration a mobile communication system according to a first embodiment of the present invention.

The mobile communication system according to the present embodiment is a mobile communication system according to an Rel. 9 LTE scheme. As shown in FIG. 1, in the mobile communication system according to the present embodiment, a radio base station eNB is configured to transmit broadcast information, specifically, SIB2 including barring information (SSAC barring information).

Figure 2:
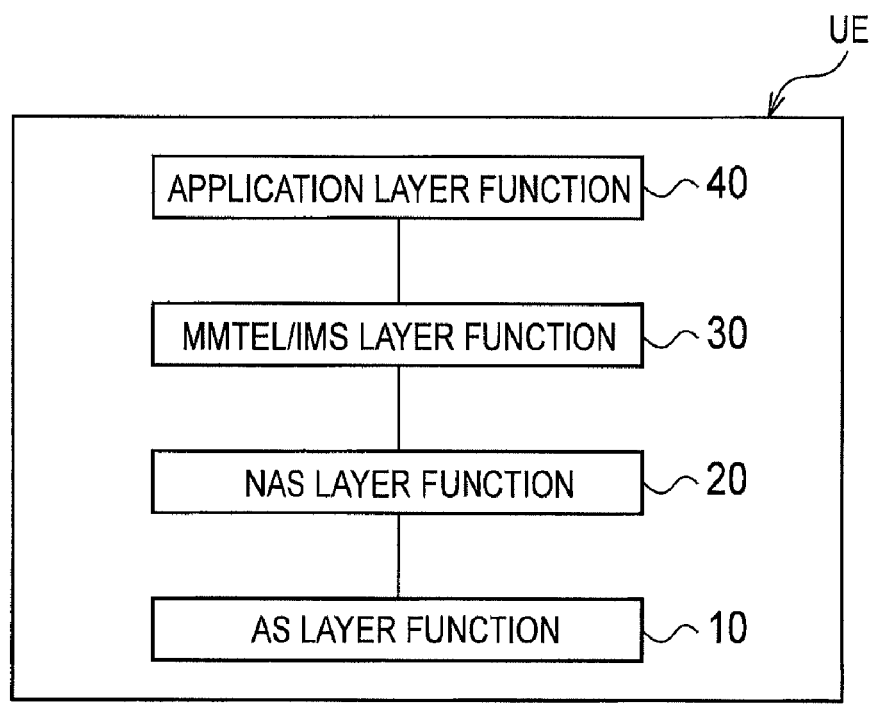
FIG. 2 is a functional block diagram of a mobile station according to the first embodiment of the present invention.

As shown in FIG. 2, a mobile station UE according to the present embodiment includes an AS (Access Stratum) layer function (first layer function) 10 that communicates between the mobile station UE and a radio access network, an NAS (Non Access Stratum) layer function 20 that communicates between the mobile station UE and a core network, an MMTEL/IMS layer function 30 that terminates between the mobile station UE and a service control network (IMS: IP Multimedia Subsystem), and an application layer function 40.

Figure 3:
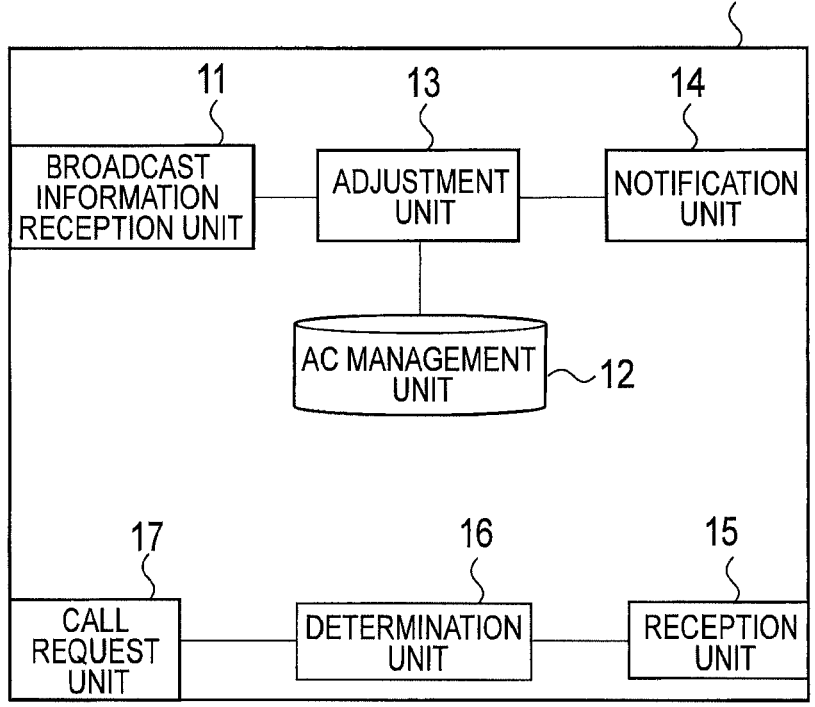
FIG. 3 is a functional block diagram of an AS layer function in the mobile station according to the first embodiment of the present invention.

As shown in FIG. 3, the AS layer function 10, that is, an RRC (Radio Resource Control) layer function includes a broadcast information reception unit 11, an AC management unit 12, an adjustment unit 13, a notification unit 14, a reception unit 15, a determination unit 16, and a call request unit 17.

The broadcast information reception unit 11 is configured to receive broadcast information transmitted by the radio base station eNB.

The AC management unit 12 is configured to manage the AC of the mobile station UE. For example, the AC management unit 12 may be provided in the USIM.

The adjustment unit 13 is configured to generate the second barring information (ac-BarringFactor and ac-BarringTime) based on the first barring information (ac-BarringFactor and ac-BarringTime) included in the ACs of the mobile station and the broadcast information (specifically, SIB2).

Specifically, as described later in view of FIG. 6, the adjustment unit 13 is configured to adjust the value of "ac-BarringFactor" and "ac-BarringTime" based on whether or not the mobile station UE owns "Special ACs (ACs 11 to 15)".

Here, the adjustment unit 13 may be configured to generate the second barring information for each type of mobile originating call (for example, MMTEL-voice mobile originating call and MMTEL-video mobile originating call).

The notification unit 14 is configured to notify the MMTEL/IMS layer function 30 of the second barring information generated by the adjustment unit 13.

Here, the notification unit 14 is configured not to notify the MMTEL/IMS layer function 30 of "ac-BarringForSpecialAC" and the ACs of the mobile station UE managed by the AC management unit 12.

Note that the adjustment unit 13 may be configured to generate the second barring information at the timing of receipt of the broadcast information by the broadcast information reception unit 11 rather than at the timing when an MMTEL-voice mobile originating call or an MMTEL-video mobile originating call is made, and the notification unit 14 may be configured to notify the MMTEL/IMS layer function 30 of the second barring information.

Furthermore, the configuration may be such that the second barring information generated by the adjustment unit 13 of the AS layer function 10 is stored, and only when the generated second barring information changes from the previously stored value, the notification unit 14 notifies the MMTEL/IMS layer function 30 of the second barring information.

The reception unit 15 is configured to receive a call request process request sent by the MMTEL/IMS layer function 30.

The determination unit 16 is configured to determine whether or not it is possible to issue a call based on whether or not the period of prohibiting the call request process is occurring (that is, whether or not the timer T302 is being activated) in response to the call request process request from the MMTEL/IMS layer function 30.

The call request unit 17 is configured to issue a call when the determination unit 16 determines that it is possible to issue a call.

Figure 4:
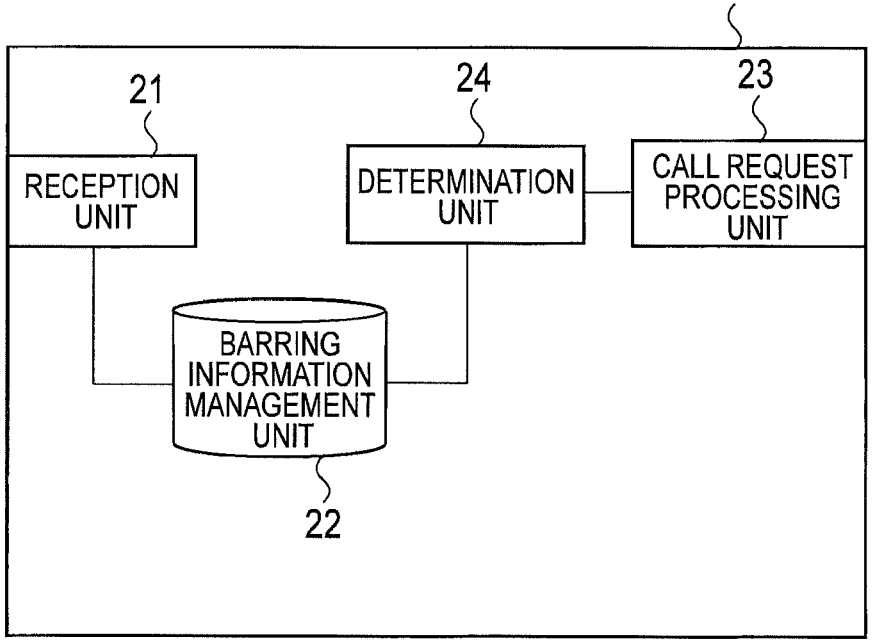
FIG. 4 is a functional block diagram of an MMTEL/IMS layer function in the mobile station according to the first embodiment of the present invention.

As shown in FIG. 4, the MMTEL/IMS layer function 30 includes a reception unit 21, a barring information management unit 22, a call request processing unit 23, and a determination unit 24.

The reception unit 21 is configured to receive the second barring information that is notified by the AS layer function 10.

The barring information management unit 22 is configured to manage the second barring information received by the reception unit 21.

The call request processing unit 23 is configured to send a call request process start request to the AS layer function 10 when the determination unit 24 determines that it is possible to perform a call request process at the time an MMTEL-voice mobile originating call or an MMTEL-video mobile originating call is made.

The determination unit 24 is configured to determine whether or not it is possible to perform the call request process based on the second barring information managed by the barring information management unit 22. The detailed determination method is described later.

For example, the determination unit 24 may be configured to determine whether or not it is possible to perform the call request process by comparing the threshold value (ac-BarringFactor) included in the second barring information and the random number (rand). Here, the random number (rand) is a uniform random number between 0 and 1.

Furthermore, the determination unit 24 may be configured to determine whether or not it is possible to perform the call request process by determining whether or not the period of prohibiting the call request process is occurring (that is, whether or not the timer T3xx is being activated), which is decided based on the time information (ac-BarringTime) included in the second barring information.

(Operation of the Mobile Communication System According to the First Embodiment of the Present Invention)

The operation of the mobile communication system according to the first embodiment of the present invention, specifically, the operation inside the mobile station UE according to the first embodiment of the present invention is explained with reference to FIG. 5 through FIG. 7.

Figure 5:
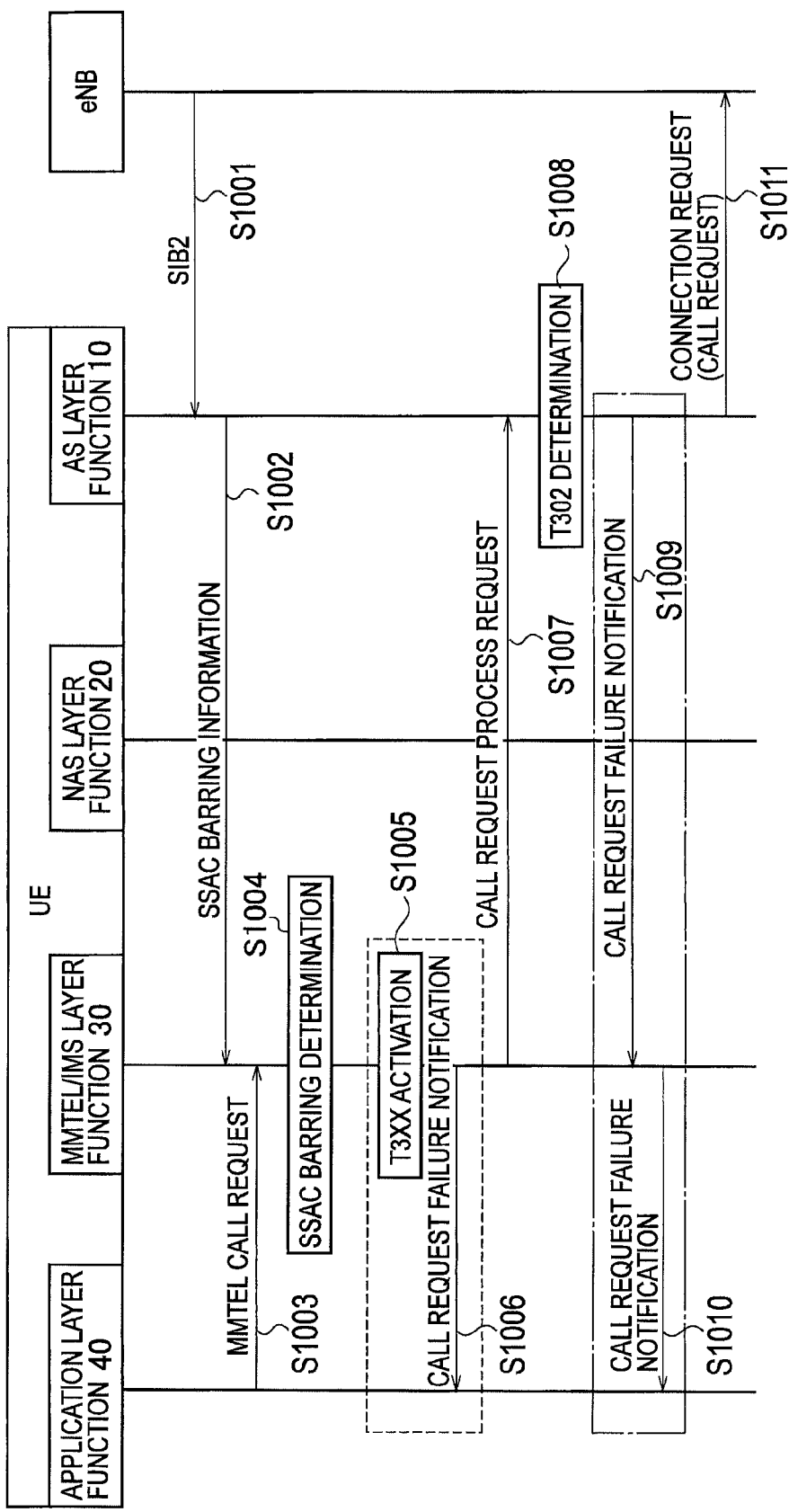
FIG. 5 is a sequence diagram showing an operation between the layer functions in the mobile station according to the first embodiment of the present invention.

As shown in FIG. 5, in step S1001, the AS layer function 10 receives the SIB2 that is transmitted by the radio base station eNB, and then generates the second barring information based on the first barring information included in the SIB2.

Here, the method of generating the second barring information is explained with reference to FIG. 6.

Figure 6:
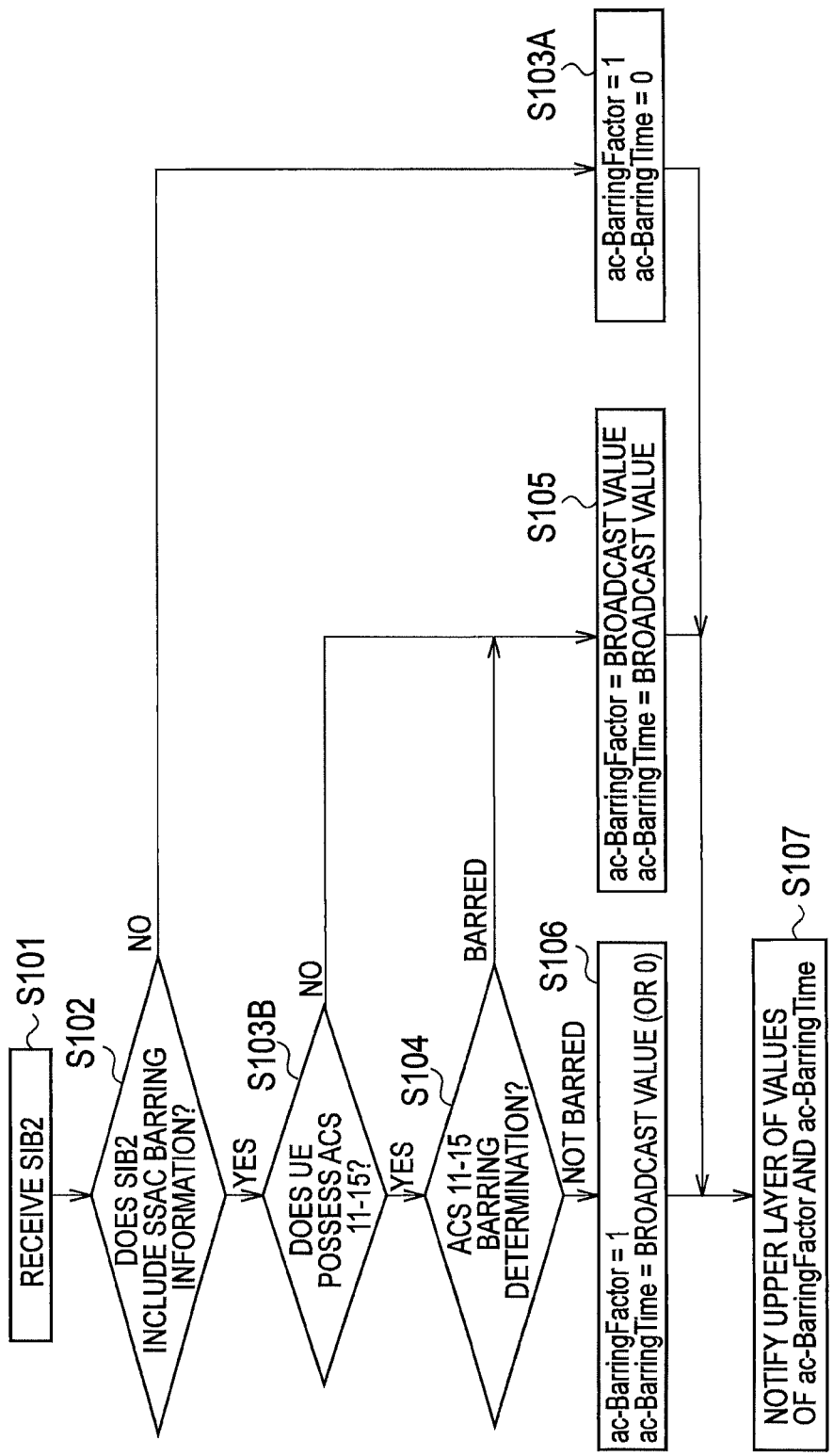
FIG. 6 is a flowchart showing an operation of the AS layer function in the mobile station according to the first embodiment of the present invention.

As shown in FIG. 6, when the AS layer function 10 receives SIB2 in step S101, the AS layer function 10 determines whether or not "ac-BarringFactor" and "ac-BarringTime" are included as the SSAC barring information (first barring information) in the received SIB2, in step S102.

If it is determined that the SSAC barring information is included, the operation proceeds to step S103B, and if it is determined that the SSAC barring information is not included, the operation proceeds to step S103A.

In step S103A, the AS layer function 10 generates "ac-BarringFactor=1" and "ac-BarringTime=0" as the second barring information.

On the other hand, in step S103B, the AS layer function 10 determines whether or not the mobile station UE owns "Special ACs (ACs 11 to 15)".

If it is determined that the mobile station UE owns "Special ACs", the operation proceeds to step S104, and if it is determined that the mobile station UE does not possess "Special ACs", the operation proceeds to step S105.

In step S104, the AS layer function 10 determines whether or not all "Special ACs" owned by the mobile station UE are barred (Barred).

If it is determined that all "Special ACs" owned by the mobile station UE are barred, the operation proceeds to step S105, and if it is determined that at least one "Special AC" owned by the mobile station UE is not barred, the operation proceeds to step S106.

In step S105, the AS layer function 10 generates "ac-BarringFactor=Broadcast value (that is, the value of "ac-BarringFactor" as the first barring information)" and "ac-BarringTime=Broadcast value (that is, the value of "ac-BarringTime" as the first barring information) as the second barring information.

In step S106, the AS layer function 10 generates, as the second barring information, "ac-BarringFactor=1" and "ac-BarringTime=0 or broadcast value (that is, the value of "ac-BarringTime" as the first barring information)".

In step S107 (that is, corresponding to step S1002 of FIG. 5), the AS layer function 10 transmits the "ac-BarringFactor" and "ac-BarringTime", which is the generated second barring information (SSAC barring information), to MMTEL/IMS layer function 30.

Returning to FIG. 5, when an MMTEL-voice mobile originating call or an MMTEL-video mobile originating call is made in step S1003, that is, when the MMTEL/IMS layer function 30 receives an MMTEL call request from the application layer function 40, the MMTEL/IMS layer function 30 performs SSAC barring determination, that is, the MMTEL/IMS layer function 30 determines whether or not it is possible to perform the call request process based on the "ac-BarringFactor" and "ac-BarringTime", which is the second barring information.

Here, the method of determining SSAC barring is explained with reference to FIG. 7.

Figure 7:
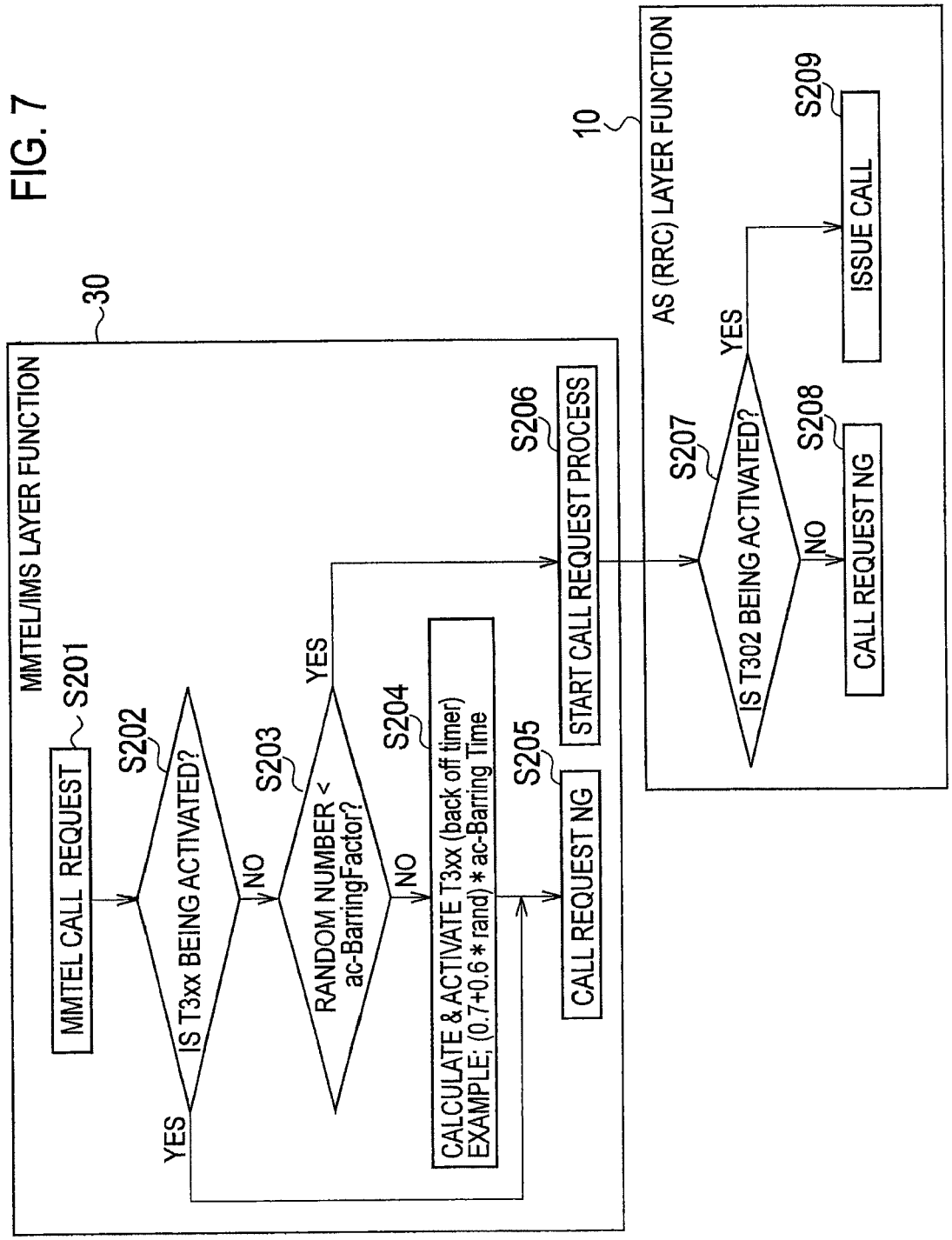
FIG. 7 is a flowchart showing an operation of the MMTEL/IMS layer function and the AS layer function in the mobile station according to the first embodiment of the present invention.

As shown in FIG. 7, when the MMTEL/IMS layer function 30 receives an MMTEL call request from the application layer function 40 in step S201, the MMTEL/IMS layer function determines whether or not the timer Txx is being activated in step S202.

If it is determined that the timer Txx is being activated, the operation proceeds to step S205, and if it is determined that the timer Txx is not activated, the operation proceeds to step S203.

In step S203, the MMTEL/IMS layer function 30 compares the random number (rand) and the "ac-BarringFactor (threshold value)", which is the second barring information. Here, the random number (rand) is a uniform random number between 0 and 1.

Here, if it is determined that the random number (rand) is smaller than the "ac-BarringFactor (threshold value)", the operation proceeds to step S206, and if it is determined that the random number (rand) is not smaller than the "ac-BarringFactor (threshold value)", the operation proceeds to step S204.

In step S204 (corresponding to step S1005 of FIG. 5), the MMTEL/IMS layer function 30 activates the timer T3xx.

Here, the MMTEL/IMS layer function 30 can assume the set value of the timer T3xx as the value of "ac-BarringTime", or as the value calculated by (0.7+0.6×"random number (u)")×"ac-BarringTime", or else, as a predetermined fixed value. Here, the "random number (u)" is a uniform random number between 0 and 1.

In step S205 (corresponding to step S1006 of FIG. 5), the MMTEL/IMS layer function 30 determines that it is not possible to perform the call request process, and transmits a call request failure notification to the application layer function 40.

In step S206 (corresponding to step S1007 of FIG. 5), the MMTEL/IMS layer function 30 determines that it is possible to perform the call request process, and transmits a call request process request to the AS layer function 10 via the NAS layer function 20.

In step S207 (corresponding to step S1008 of FIG. 5), the AS layer function 10 determines whether or not the timer T302 is being activated.

If it is determined that the timer T302 is being activated, the operation proceeds to step S208 (corresponding to step S1009 of FIG. 5), and if it is determined that the timer T302 is not activated, the operation proceeds to step S209 (corresponding to step S1011 of FIG. 5).

In step S208, the AS layer function 10 determines that it is not possible to issue a call, and then, transmits a call request failure notification to the upper layer (to the MMTEL/IMS layer function 30 via the NAS layer function 20). Following this, in step S1010 of FIG. 5, the MMTEL/IMS layer function 30 transmits a call request failure notification to the application layer function 40.

On the other hand, in step S209, the AS layer function 10 determines that it is possible to issue a call, and issues a call, that is, transmits a connection request to the radio base station eNB.

Note that when the AS layer function 10 receives RRCConnectionReject (Reject signal) from the radio base station eNB in response to the connection request, the AS layer function sets T302 to the value included in RRCConnectionReject, and activates T302.

At this time, the AS layer function 10 may be configured to simultaneously notify the MMTEL/IMS layer function 30 of the value of T302, and the MMTEL/IMS layer function 30 may be configured to determine whether or not the timer T302 in the step S207 is being activated.

Alternatively, the MMTEL/IMS layer function 30 may set T3xx to the value of the timer T302 received from the AS layer function 10, and then activate T3xx.

Note that as a modification, when the mobile station UE changes a serving cell as a result of cell selection or re-selection, the AS layer function 10 can set the "ac-BarringFactor" to "1" and the "ac-BarringTime" to "0" (or to any particular value), and then notify the MMTEL/IMS layer function 30 of the same. In other words, the AS layer function 10 can perform a barring release notification to the MMTEL/IMS layer function 30.

Alternatively, the AS layer function 10 can notify the MMTEL/IMS layer function 30 of the fact that the "ac-BarringFactor" and the "ac-BarringTime" are disabled.

Upon receiving the notification, the MMTEL/IMS layer function 30 may stop the timer T3xx that is being activated.

Because the barring information is different for each cell, the process described in the present invention is performed again when the broadcast information (SIB2) is received again in a new cell.

Particularly, in the case of transition to a cell having a different radio access scheme than the LTE scheme, the LTE-scheme broadcast information is not broadcast in the concerned cell, but because the MMTEL/IMS layer function 30 does not particularly take into consideration the radio access scheme of the AS layer function 10, such a release notification is beneficial.

(Operation and Effect of the Mobile Communication System According to the First Embodiment of the Present Invention)

According to the mobile communication system of the first embodiment of the present invention, because the MMTEL/IMS layer function 30 is configured to perform SSAC barring based on the second barring information generated in view of the barring of the "Special ACs" by the AS layer function 10, the ACs of the mobile station UE can be concealed from the MMTEL/IMS layer function 30, and at the same time, SSAC barring can be performed in the MMTEL/IMS layer function.

Furthermore, according to the mobile communication system of the first embodiment of the present invention, the MMTEL/IMS layer function 30 can perform the SSAC barring determination process based on only the second barring information (ac-BarringFactor and ac-BarringTime) without taking into consideration the ACs of the mobile station UE and the barring information according to the broadcast "Special ACs", which has the benefit of simplification of the barring determination process.

Furthermore, according to the mobile communication system of the first embodiment of the present invention, the AS layer function 10 generates the second barring information at the timing of receipt of the broadcast information rather than at the timing when an MMTEL-voice mobile originating call or an MMTEL-video mobile originating call is made, and notifies the MMTEL/IMS layer function 30 of it beforehand, which can speed up the process at the time an MMTEL-voice mobile originating call and an MMTEL-video mobile originating call is made.

Additionally, according to the mobile communication system of the first embodiment of the present invention, the AS layer function 10 notifies the MMTEL/IMS layer function 30 of the generation of the second barring information only when the result is different from the previous result, which can reduce the frequency of notification of the second barring information.

First Modification

Figure 8:
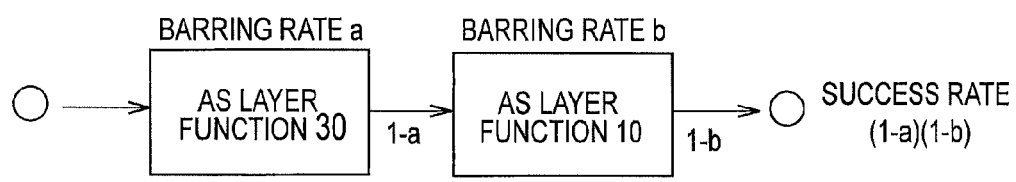
FIG. 8 is a diagram for explaining the mobile station according to a first modification of the present invention.
Figure 9:
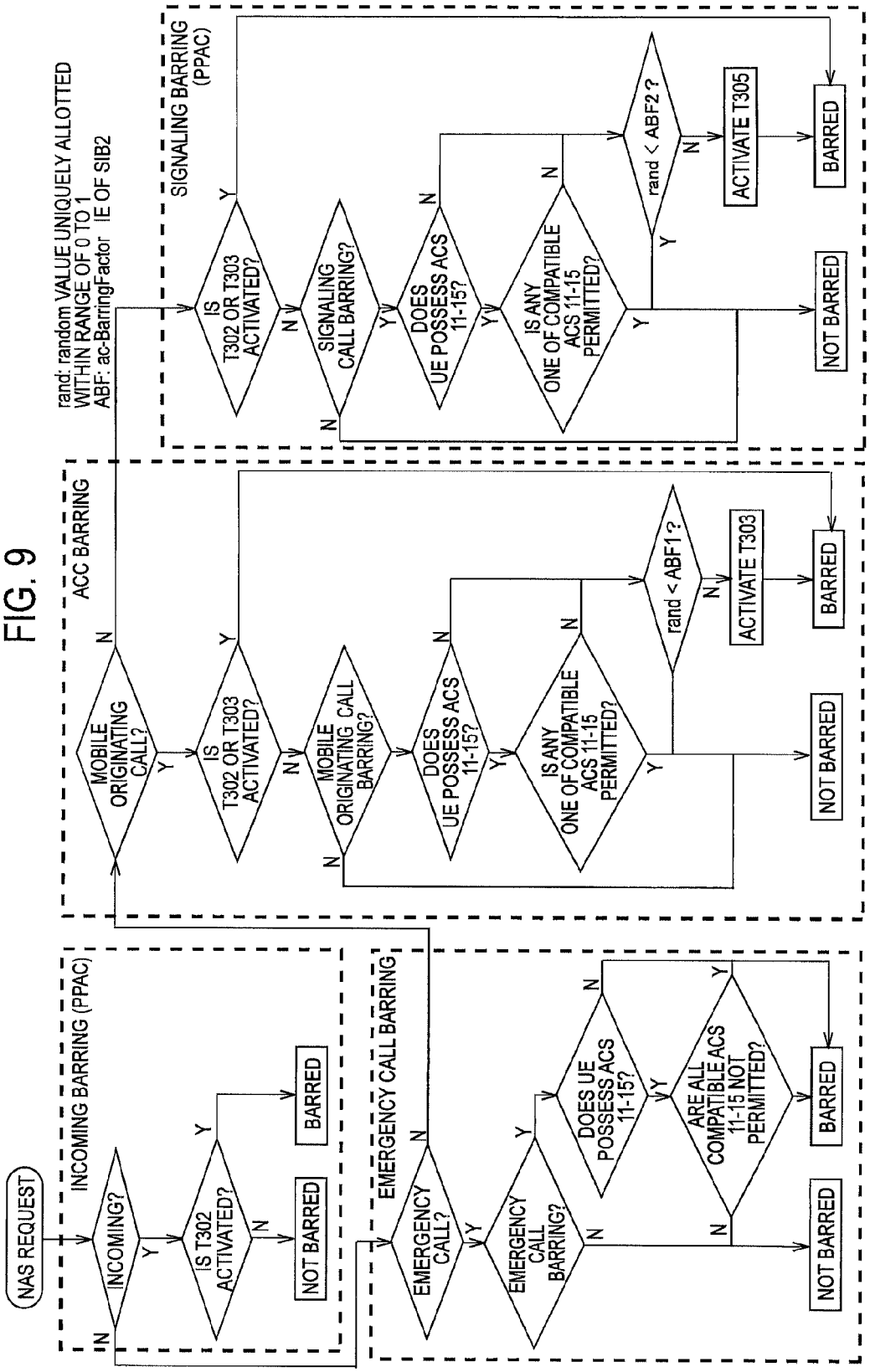
FIG. 9 is a flowchart showing an access barring control method in a mobile communication system according to an Rel. 8 LTE scheme.

With reference to FIG. 8, description will be given below while focusing on the difference between the mobile communication system according to the first modification of the present invention, specifically, the mobile station UE according to the first modification of the present invention, and the mobile communication system according to the first embodiment of the present invention, specifically, the mobile station UE according to the first embodiment of the present invention.

According to the Rel. 9 LTE scheme, SSAC is configured to be implemented in the MMTEL/IMS layer function 30.

Furthermore, according to the Rel. 8 LTE scheme, the determination of whether or not it is possible to perform the call request process for a U-plane mobile originating call in the AS layer function 10 (that is, the RRC layer function), in other words, the access barring determination (Access Class Barring) of a U-plane mobile originating call is applied. Here, even in the Rel. 9 LTE scheme, the access barring determination of a U-plane mobile originating call of the AS layer function 10 according to the Rel. 8 scheme is applied.

However, this is difficult because in order to notify the AS layer function 10 (that is, the RRC layer function) of the type of the mobile originating call (that is, the "MMTEL/IMS-voice mobile originating call", "MMTEL/IMS-video mobile originating call", or other call types) from the MMTEL/IMS layer function 30, changing the U-plane protocol stack becomes necessary.

In other words, a complex process, wherein a header, for example, expressing the call type is provided in a packet in the SIP layer and IP layer that are the lower layers of the MMTEL/IMS layer function 30, and then packet inspection is performed in the AS layer function 10 that is a further lower layer to distinguish the call type, becomes necessary.

Therefore, an operation, whereby when the AS layer function 10 performs the access barring determination (Access Class Barring), the determination is not performed for only the "MMTEL/IMS-voice mobile originating call" and the "MMTEL/IMS-video mobile originating call", cannot be performed.

That is, whether or not barring must be performed for the "MMTEL/IMS-voice mobile originating call" and the "MMTEL/IMS-video mobile originating call" is determined in both the MMTEL/IMS layer function 30 and the AS layer function 10, which means that double barring is applied.

In such a case, if the barring rate of the MMTEL/IMS layer function 30 is assumed to be "a" and the barring rate of the AS layer function 10 is assumed to be "b", then as shown in FIG. 8, the barring rate applicable to the "MMTEL/IMS-voice mobile originating call" and the "MMTEL/IMS-video mobile originating call" becomes "(1−a) (1−b)".

Note that the relationship between the barring rate and the threshold value (ac-BarringFactor) is "threshold value (ac-BarringFactor)=1−barring rate".

Here, if the desired barring rate applicable to "MMTEL/IMS-voice mobile originating call" and "MMTEL/IMS-video mobile originating call" is assumed to be "c", it is preferable to establish the relationship "(1−c)=(1−a)(1−b)".

That is, if the barring rate "a" that is equal to "1−(1−c)/(1−b)" is notified from the AS layer function 10 to the MMTEL/IMS layer function 30, the barring rate notified by the broadcast information may be "c".

Therefore, the mobile station UE according to the first modification uses the following configuration.

The determination unit 24 of the MMTEL/IMS layer function 30 is configured to determine whether or not it is possible to perform the call request process based on the barring rate "a".

Furthermore, the determination unit 16 of the AS layer function 10 is configured to determine whether or not it is possible to perform the call request process based on the barring rate "b".

Furthermore, the broadcast information reception unit 11 of the AS layer function 10 is configured to acquire the barring rate "c" from the broadcast information.

Here, according to the Rel. 9 LTE scheme, any one of "0%", "5%", "10%" "15%", "20%", "25%" "30%" "40%" "50%" "60%" "70%" "75%", "80%", "85%", "90%", and "95%" is configured to be included as the "threshold value (ac-BarringFactor)" in the first barring information within the broadcast information.

Therefore, depending on the first barring information within the broadcast information, any one of "No barring", "5%", "10%", "15%", "20%" "25%", "30%" "40%", "50%", "60%" "70%", "75%", "80%", "85%", "90%", "95%", and "100%" is configured to be broadcast as the barring rate.

When the radio base station eNB broadcasts any one of the above barring rates as the value of the barring rate "a", the barring rate "c" applicable to the "MMTEL/IMS-voice mobile originating call" and the "MMTEL/IMS-video mobile originating call" cannot maintain a "granularity" of "No barring", "5%", "10%", "15%", "20%", "25%", "30%", "40%", "50%", "60%", "70%", "75%", "80%", "85%" "90%", "95%", and "100%" because both the MMTEL/IMS layer function 30 and the AS layer function 10 of the mobile station UE perform the barring determination.

Therefore, according to the mobile communication system of the first modification, the configuration is such that the radio base station eNB broadcasts any one of the above barring rates as the value of the barring rate "c", and in the mobile station UE, the broadcast information reception unit 11 of the AS layer function 10 acquires the barring rate "c" from the broadcast information, the adjustment unit 12 of the AS layer function 10 calculates the barring rate "a" from "1−(1−c)/(1=b)", and the notification unit 13 of the AS layer function 10 notifies the MMTEL/IMS layer function 30 of the second barring information including the barring rate "a", which is to be calculated. Note that it is assumed that the relationship "c≧b" is established.

Here, the barring rate "b" is set by the threshold value "ac-Barring Factor" that is broadcast for the access barring determination (Access Class Barring) according to the Rel. 8 LTE scheme in addition to being broadcast for SSAC according to the Rel. 9 LTE scheme.

Here, "float", for example, can also be used in "primitive" that is notified the MMTEL/IMS layer function 30 by the notification unit 14 of the AS layer function 10. That is, because the barring rate "a" cannot be expressed by a four-bit integer, for example, the notification unit 14 of the AS layer function 10 is configured to notify the barring rate "a" as a decimal value.

As a result, the barring rate for SSAC that is described in the broadcast information matches the barring rate that is applicable to the actual "MMTEL/IMS-voice mobile originating call" and "MMTEL/IMS-video mobile originating call". Furthermore, SSAC can be operated with the aforementioned "granularity".

The characteristics of the present embodiment as described above may be expressed as follows.

A first characteristic of the present embodiment is summarized as a mobile station UE equipped with an AS layer function 10 that communicates between the mobile station UE and a radio access network, and an MMTEL/IMS layer function 30 that terminates between the mobile station UE and a service control network, wherein the AS layer function 10 includes a broadcast information reception unit 11 configured to receive the broadcast information, an AC management unit 12 configured to manage the ACs of the mobile station UE, an adjustment unit 13 configured to generate the second barring information (ac-BarringFactor and ac-BarringTime) based on the first barring information (ac-BarringFactor and ac-BarringTime) included in the ACs of the mobile station and the broadcast information, and a notification unit 14 configured to notify the MMTEL/IMS layer function 30 of the second barring information, and the MMTEL/IMS layer function 30 includes a determination unit 24 is configured to determine whether or not it is not possible to perform a call request process based on the second barring information.

In the first characteristic of the present embodiment, the AS layer function 10 may further include a determination unit 16 configured to determine whether or not it is possible to issue a call based on whether or not the period of prohibiting the call request process is occurring (that is, whether or not the timer T302 is being activated) in response to the call request process request from the MMTEL/IMS layer function 30.

In the first characteristic of the present embodiment, when receiving a Reject signal from the radio base station in response to the connection request, the determination unit 16 of the AS layer function 10 may be configured to activate the timer T302 that manages the period of prohibiting the call request process based on the value included in the Reject signal.

In the first characteristic of the present embodiment, the determination unit 24 of the MMTEL/IMS layer function 30 may be configured to determine whether or not it is possible to perform the call request process by comparing the threshold value (ac-BarringFactor) included in the second barring information with a random number (rand).

In the first characteristic of the present embodiment, the determination unit 24 of the MMTEL/IMS layer function 30 may be configured to determine whether or not it is possible to perform the call request process by determining whether or not the period of prohibiting the call request process is occurring (that is, whether or not the timer T3xx is being activated), which is decided based on the time information (ac-BarringTime) included in the second barring information.

In the first characteristic of the present embodiment, the determination unit 24 of the MMTEL/IMS layer function 30 may be configured to activate the timer T3xx that manages the period of prohibiting the call request process based on the time information included in the second barring information, when it determines that the call request process cannot be performed.

In the first characteristic of the present embodiment, the adjustment unit 13 of the AS layer function 10 may be configured to generate the second barring information for each type of mobile originating call (for example, MMTEL-voice mobile originating call and MMTEL-video mobile originating call).

In the first characteristic of the present embodiment, the configuration may be such that the adjustment unit 13 of the AS layer function 10 generates the second barring information, and the notification unit 14 of the AS layer function 10 notifies the MMTEL/IMS layer function 30 of the second barring information, when the broadcast information is received by the broadcast information reception unit 11 of the AS layer function 10.

In the first characteristic of the present embodiment, the configuration may be such that the second barring information generated by the adjustment unit 13 of the AS layer function 10 is stored, and only when the generated second barring information changes from the previously stored value, the notification unit 14 of the AS layer function 10 notifies the MMTEL/IMS layer function 30 of the second barring information.

In the first characteristic of the present embodiment, the AS layer function 10 includes a determination unit 16 configured to determine whether or not it is possible to perform the call request process, the determination unit 24 of the MMTEL/IMS layer function 30 is configured to determine whether or not the call request process can be performed based on the barring rate "a", the determination unit 16 of the AS layer function 10 is configured to determine whether or not it is possible to perform the call request process based on the barring rate "b", the broadcast information reception unit 11 of the AS layer function 10 is configured to acquire the barring rate "c" from the received broadcast information, and the notification unit 14 of the AS layer function 10 may be configured to notify the MMTEL/IMS layer function 30 of the second barring information including the barring rate "a" calculated from "1−(1−c)/(1−b)".

In the first characteristic of the present embodiment, the AS layer function 10 includes a determination unit 16 configured to determine whether or not it is possible to perform the call request process, the determination unit 24 of the MMTEL/IMS layer function 30 is configured to determine whether or not it is possible to perform the call request process based on the threshold value "A" (that is, the barring rate "1−A"), the determination unit 16 of the AS layer function 10 is configured to determine whether or not it is possible to perform the call request process based on the threshold value "B" (that is, the barring rate "1−B"), the broadcast information reception unit 11 of the AS layer function 10 is configured to acquire the threshold value "B" and the threshold value "C (=1−barring rate c)" included in the broadcast information, and the notification unit 14 of the AS layer function 10 may be configured to notify the MMTEL/IMS layer function 30 of the second barring information including the threshold value "A" calculated from "C/B".

In addition, the operation of the above-mentioned the radio base station eNB or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the radio base station eNB or mobile station UE. As a discrete component, such storage medium and processor may be arranged in the radio base station eNB or mobile station UE.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile station that can conceal the AC of the mobile station UE from the MMTEL/IMS layer function, and at the same time, perform SSAC barring in the MMTEL/IMS layer function.

The invention claimed is:

1. A mobile station, comprising:
   a first layer function that communicates between the mobile station and a radio access network, and
   a second layer function that terminates between the mobile station and a service control network, wherein
   the first layer function comprises:
   a broadcast information reception unit configured to receive the broadcast information;
   an adjustment unit configured to generate second barring information based on access classes of the mobile station and the first barring information included in the broadcast information; and
   a notification unit configured to notify the second layer function of the second barring information, and
   the second layer function comprises
   a determination unit configured to determine whether or not it is possible to perform a call request process based on the second barring information,
   wherein the determination unit of the second layer function is configured to perform the determination by determining whether or not the period of prohibiting the call request process is occurring, which is decided based on the time information included in the second barring information, wherein
   the determination unit of the second layer function is configured to activate a timer for managing the period of prohibiting the call request process based on the information included in the second barring information, when it determines that the call request process cannot be performed.

2. The mobile station according to claim 1, wherein the first layer function further comprises a determination unit configured to determine, in response to the call request process request from the second layer function, whether or not it is possible to issue a call based on whether or not the period of prohibiting the call request process is occurring.

3. The mobile station according to claim 2, wherein when receiving a Reject signal from a radio base station in response to a connection request, the determination unit of the first layer function is configured to activate a timer for managing the period of prohibiting the call request process based on the value included in the Reject signal.

4. The mobile station according to claim 1, wherein the determination unit 24 of the second layer function is configured to perform the determination by comparing a threshold value included in the second barring information with a random number.

5. The mobile station according to claim 1, wherein the adjustment unit is configured to generate the second barring information for each type of mobile originating call.

6. The mobile station according to claim 1, wherein
when the broadcast information is received by the broadcast information reception unit, the adjustment unit is configured to generate the second barring information, and the notification unit is configured to notify the second layer function of the second barring information.

7. The mobile station according to claim 1, wherein
the second barring information generated by the adjustment unit is stored, and only when the generated second barring information changes from the previously stored value, the notification unit is configured to notify the second layer function of the second barring information.

8. The mobile station according to claim 1, wherein
the first layer function is an AS layer function, and
the second layer function is an MMTEL layer function or an IMS layer function.

9. The mobile station according to claim 1, wherein
the first layer function comprises a determination unit configured to determine whether or not it is possible to perform a call request process,
the determination unit of the second layer function is configured to determine whether or not it is possible to perform a call request process based on a barring rate "a",
the determination unit of the first layer function is configured to determine whether or not it is possible to perform a call request process based on a barring rate "b",
the broadcast information reception unit of the first layer function is configured to acquire a barring rate "c" from the received broadcast information, and
the notification unit of the first layer function is configured to notify the second layer function of the second barring information including the barring rate "a" calculated from "1−(1−c/(1−b)".

10. The mobile station according to claim 1, wherein
the first layer function comprises a determination unit configured to determine whether or not it is possible to perform a call request process,
the determination unit of the second layer function is configured to determine whether or not it is possible to perform a call request process based on a threshold value "A",
the determination unit of the first layer function is configured to determine whether or not it is possible to perform a call request process based on a threshold value "B",
the broadcast information reception unit of the first layer function is configured to acquire the threshold value "B" and the threshold value "C" included in the broadcast information, and
the notification unit of the first layer function is configured to notify the second layer function of the second barring information including the threshold value "A" calculated from "C/B".

* * * * *